United States Patent
Chen et al.

(10) Patent No.: US 10,036,804 B2
(45) Date of Patent: Jul. 31, 2018

(54) ULTRASOUND SCANNING METHOD AND SYSTEM

(71) Applicant: Qisda Corporation, Taoyuan (TW)

(72) Inventors: Hsiang-Chou Chen, Hsinchu (TW); Fu-Yen Kuo, Hsinchu (TW)

(73) Assignee: Qisda Corporation, Taoyuan (TW)

( * ) Notice: Subject to any disclaimer, the term of this patent is extended or adjusted under 35 U.S.C. 154(b) by 399 days.

(21) Appl. No.: 14/864,828

(22) Filed: Sep. 24, 2015

(65) Prior Publication Data

US 2016/0097845 A1   Apr. 7, 2016

(30) Foreign Application Priority Data

Oct. 1, 2014 (TW) .............................. 103134314 A

(51) Int. Cl.
  *G01S 7/52* (2006.01)
  *G10K 11/26* (2006.01)
  *G01S 15/89* (2006.01)

(52) U.S. Cl.
  CPC ...... *G01S 7/52077* (2013.01); *G01S 15/8995* (2013.01)

(58) Field of Classification Search
  CPC ...................... G01S 7/52077; G01S 15/8995
  See application file for complete search history.

(56) References Cited

U.S. PATENT DOCUMENTS

2012/0157850 A1* 6/2012 Sumi .................... A61B 8/0891
                                                                  600/443
2016/0097845 A1* 4/2016 Chen ................... G01S 7/52077
                                                                  367/7

FOREIGN PATENT DOCUMENTS

| CN | 103908300 | 7/2014 |
| TW | 201325556 A1 | 7/2013 |
| WO | 2013098696 | 7/2013 |

* cited by examiner

*Primary Examiner* — Daniel T Pihulic

(57) ABSTRACT

An ultrasound scanning method includes the steps of emitting N sets of ultrasound signals onto a target from N different angles and receiving the N sets of ultrasound signals reflected and/or scattered by the target; converting the N sets of ultrasound signals into N ultrasound input images; performing a binarization algorithm for the N ultrasound input images to obtain N binarized images; performing a comparison process on the N binarized images to determine whether a noise exists in at least one of the N binarized images; when the noise exists in an i-th binarized image of the N binarized images, removing the noise from an i-th ultrasound input image corresponding to the i-th binarized image; and compounding the N ultrasound input images into an ultrasound output image.

8 Claims, 9 Drawing Sheets

ULTRASOUND SCANNING METHOD AND SYSTEM

BACKGROUND OF THE INVENTION

1. Field of the Invention

The present invention relates to an ultrasound scanning method and an ultrasound scanning system, and more particularly, to an ultrasound scanning method and an ultrasound scanning system capable of effective noise filtering.

2. Description of the Prior Art

Since ultrasound does not damage materials structures and human cells, it has been widely applied in the material field and clinical detection. Because compounded images provide better resolution, they have been widely used in the ultrasound scanning system. To obtain a compounded image, ultrasound signals have to be emitted from different angles and received, and ultrasound images corresponding to the different angles are then compounded into a single compounded ultrasound image. However, there are generally side lobes, artifacts or other types of noises in the ultrasound image generated from the ultrasound signals corresponding to the different angles, and accuracy of the compounded ultrasound image is therefore affected. Thus, how to effectively filter noises has become an important topic in the ultrasound scanning technology.

SUMMARY OF THE INVENTION

An embodiment of the present invention provides an ultrasound scanning method. The ultrasound scanning method includes the steps of: emitting N sets of ultrasound signals onto a target from N different angles and receiving the N sets of ultrasound signals reflected and/or scattered by the target, wherein each of the N sets of ultrasound signals corresponds to one of the N different angles and N is a positive integer greater than 1; converting the N sets of ultrasound signals into N ultrasound input images; binarizing the N ultrasound input images to obtain N binarized images; comparing the N binarized images to determine whether a noise exists in at least one of the N binarized images; when the noise exists in an i-th binarized image of the N binarized images, removing the noise from an i-th ultrasound input image corresponding to the i-th binarized image, wherein i is a positive integer smaller than or equal to N; and compounding the N ultrasound input images into an ultrasound output image.

Another embodiment of the present invention provides an ultrasound scanning system. The ultrasound scanning system includes an ultrasound scanning probe and an ultrasound scanning device communicating with the ultrasound scanning probe. The ultrasound scanning probe emits N sets of ultrasound signals onto a target from N different angles and receives the N sets of ultrasound signals reflected and/or scattered by the target. Each of the N sets of ultrasound signals corresponds to one of the N different angles and N is a positive integer greater than 1. The ultrasound scanning device includes a conversion unit, a binarization unit, a comparison unit, a noise filtering unit and an image compounding unit. The conversion unit converts the N sets of ultrasound signals into N ultrasound input images. The binarization unit binarizes the N ultrasound input images to obtain N binarized images. The comparison unit compares the N binarized images to determine whether a noise exists in at least one of the N binarized images. The noise filtering unit removes the noise from an i-th ultrasound input image corresponding to an i-th binarized image of the N binarized images when the noise exists, therein i is a positive integer smaller than or equal to N. The image compounding unit then compounds the N ultrasound input images into an ultrasound output image.

In sum, in the present invention, after a plurality of ultrasound input images corresponding to different angles are obtained, the ultrasound input images are converted into binarized images, and the binarized images are compared to determine whether any noise exists. When determining that a noise exists in the binarized images, the noise is removed from the ultrasound input image corresponding to the binarized image containing the noise. The ultrasound input images without noises are then compounded into a single ultrasound output image. Since the noise is removed from the ultrasound input images before the ultrasound input images are compounded, the compounded ultrasound output image is not affected by the noise so that accuracy of the ultrasound output image can be effectively improved.

The above and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

Figure 1:
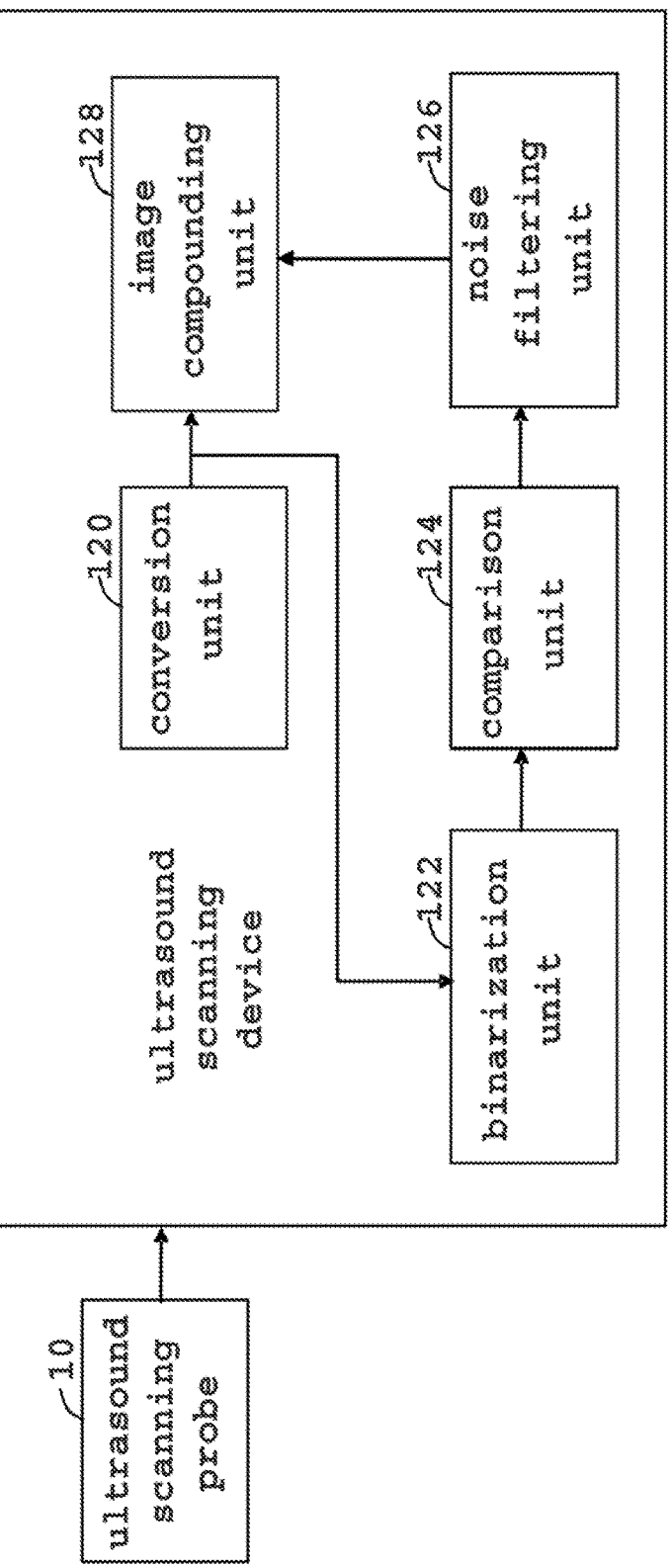
FIG. 1 is an illustrative functional block diagram of an ultrasound scanning system according to an embodiment of the present invention.
Figure 2:
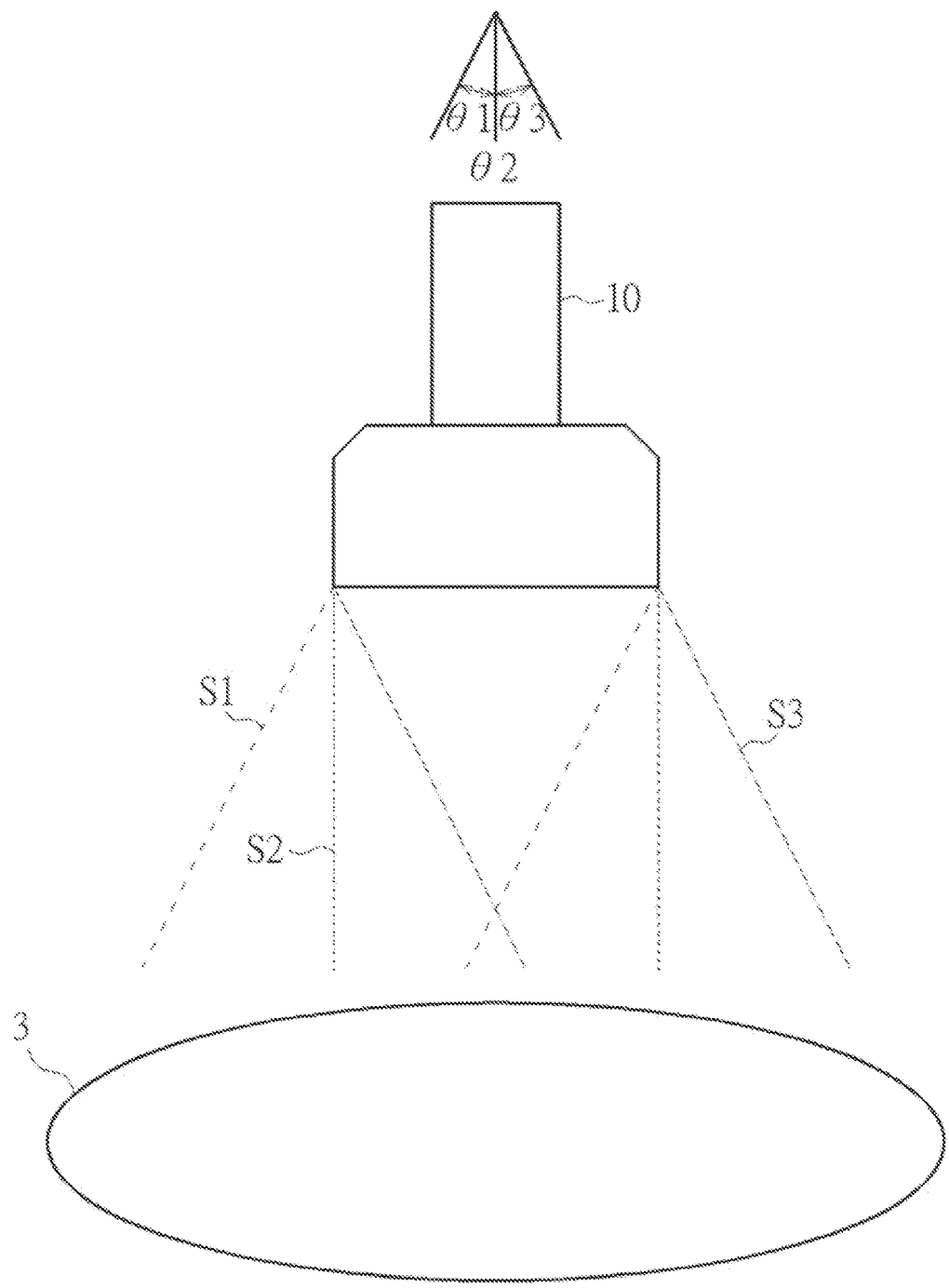
FIG. 2 is an illustrative diagram of the ultrasound scanning probe of FIG. 1 scanning a target.
Figure 3:
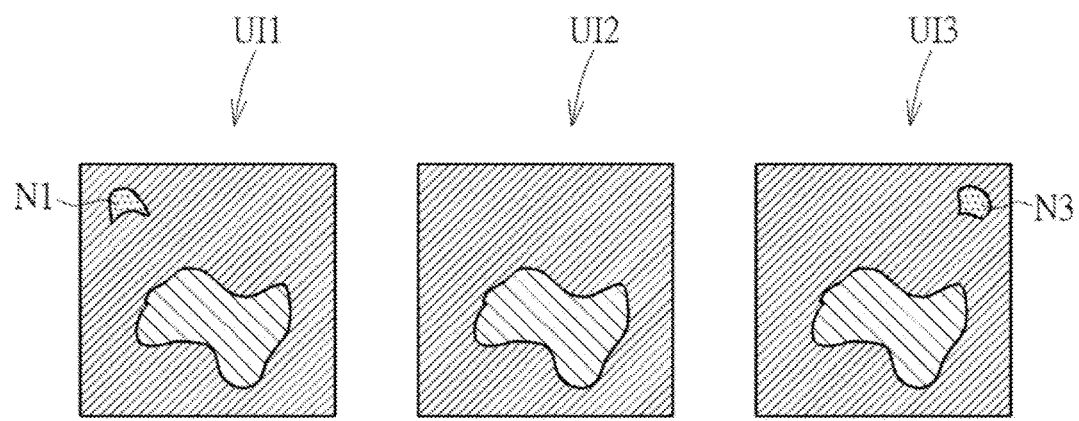
FIG. 3 is an illustrative diagram of ultrasound input images generated by the ultrasound scanning device of FIG. 1 based on the scanning operation shown in FIG. 2.
Figure 4:
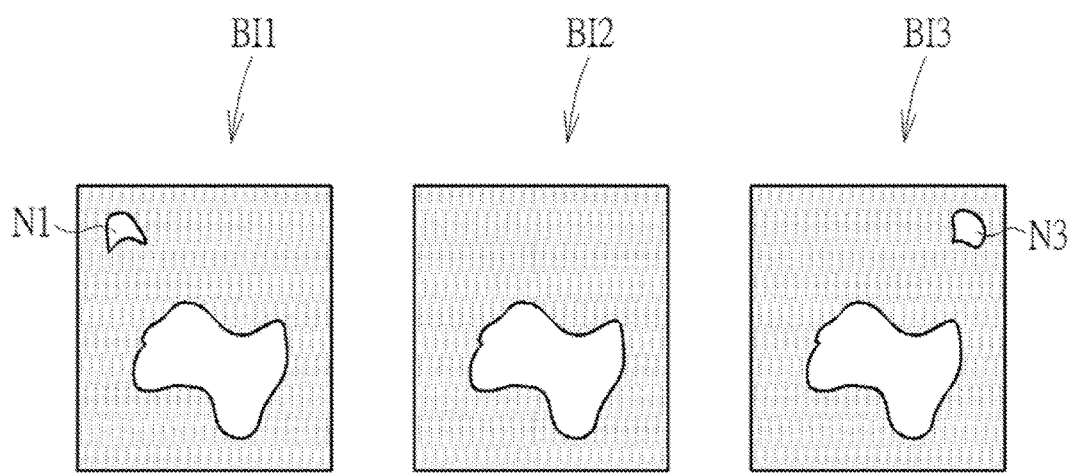
FIG. 4 is an illustrative diagram of converting the ultrasound input images of FIG. 3 into binarized images by the ultrasound scanning device of FIG. 1.
Figure 5:
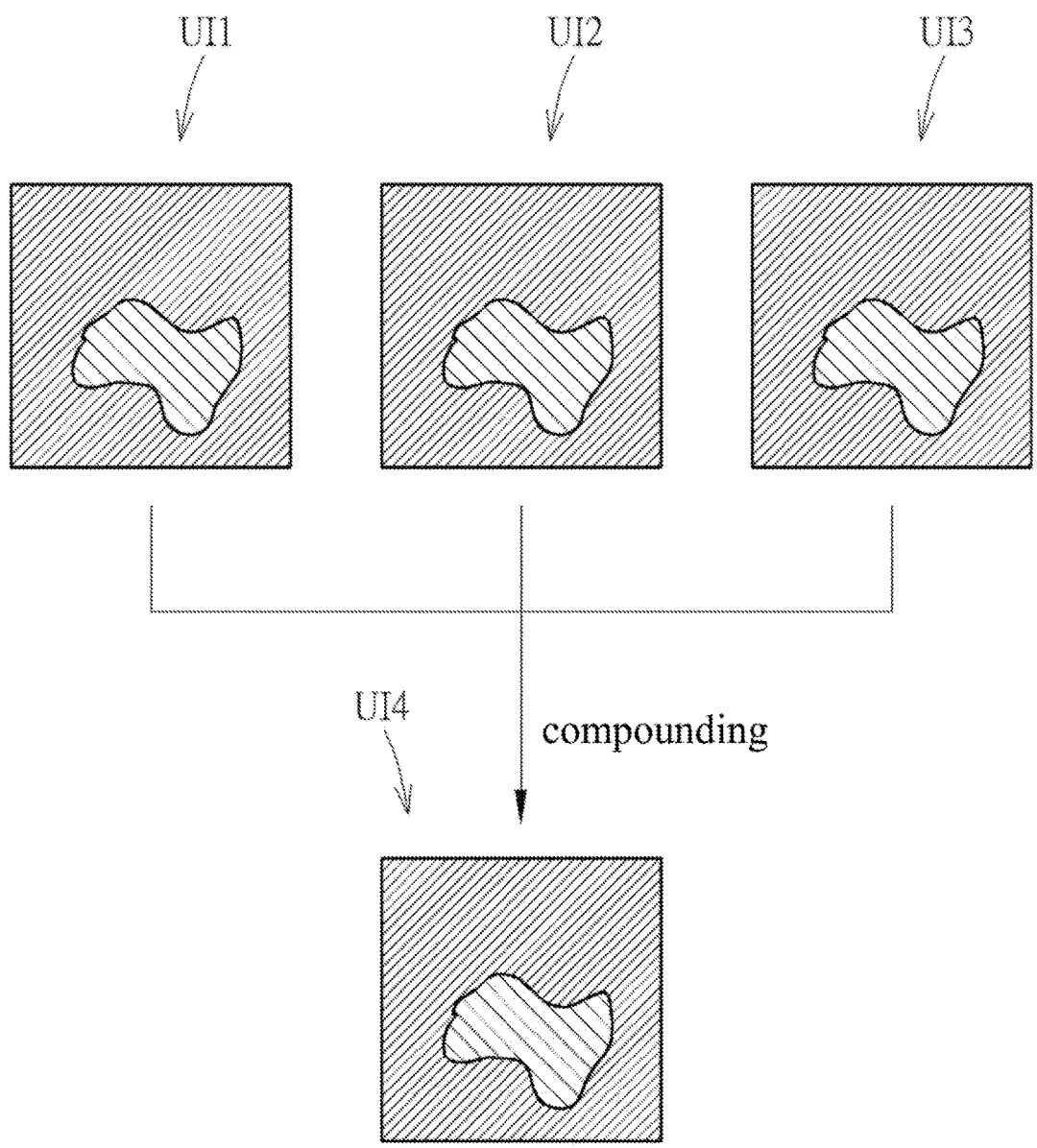
FIG. 5 is an illustrative diagram of compounding the ultrasound input images of FIG. 3 into an ultrasound output image after noise is filtered.

Please refer to FIG. 1 through FIG. 6. FIG. 1 is an illustrative functional block diagram of an ultrasound scanning system 1 according to an embodiment of the present invention. FIG. 2 is an illustrative diagram of an ultrasound scanning probe 10 of FIG. 1 scanning a target 3. FIG. 3 is an illustrative diagram of ultrasound input images UI1, UI2 and UI3 generated by the ultrasound scanning device 12 of FIG. 1 based on the scanning operation shown in FIG. 2. FIG. 4 is an illustrative diagram of converting the ultrasound input images UI1, UI2 and UI3 of FIG. 3 into binarized images BI1, BI2 and BI3 by the ultrasound scanning device 12 of FIG. 1. FIG. 5 is an illustrative diagram of compounding the ultrasound input images UI1, UI2 and UI3 of FIG. 3 into an ultrasound output image UI4 after noise is filtered.

Figure 6:
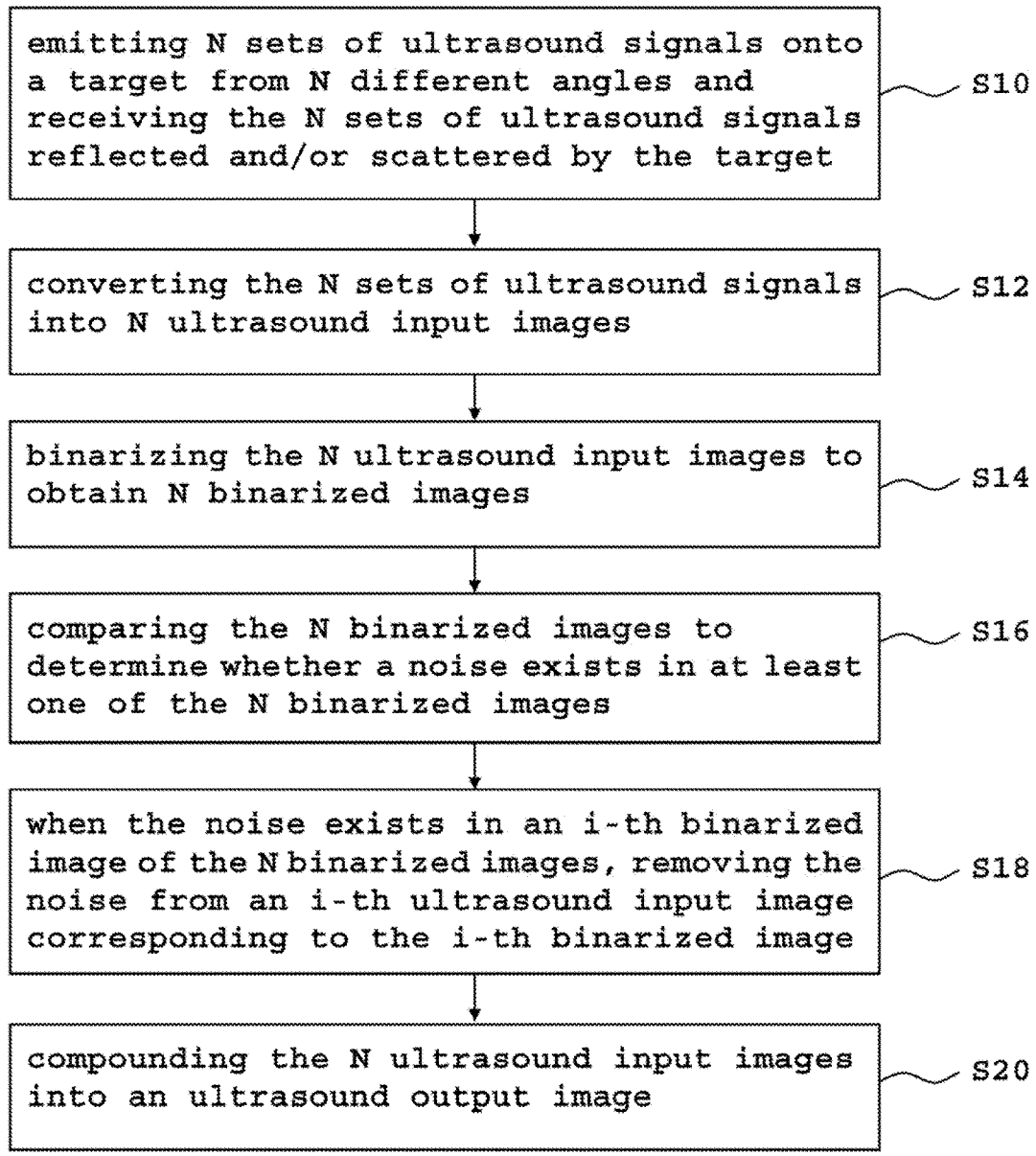
FIG. 6 is an illustrative flowchart of an ultrasound scanning method according to another embodiment of the present invention.

FIG. 6 is an illustrative flowchart of an ultrasound scanning method according to another embodiment of the present invention. The ultrasound scanning method shown in FIG. 6 can be implemented on the ultrasound scanning system 1 shown in FIG. 1.

As shown in FIG. 1, the ultrasound scanning system 1 includes an ultrasound scanning probe 10 and an ultrasound scanning device 12 communicating with the ultrasound scanning probe 10. The ultrasound scanning device 12 may be a computer or other electronic devices with data processing and image display functions. The ultrasound scanning device 12 may communicate with the ultrasound scanning probe 10 via a cable so that the display of the ultrasound scanning device 12 can display the ultrasound scanning image when the ultrasound scanning probe 10 scans a target by ultrasound.

In the embodiment, the ultrasound scanning device 12 includes a conversion unit 120, a binarization unit 122, a comparison unit 124, a noise filtering unit 126 and an image compounding unit 128. The binarization unit 122 is electrically connected to the conversion unit 120, the comparison unit 124 is electrically connected to the binarization unit 122, the noise filtering unit 126 is electrically connected to the comparison unit 124, and the image compounding unit 128 is electrically connected to the conversion unit 120 and the noise filtering unit 126.

As shown in FIG. 2, when an operator uses the ultrasound scanning probe 10 to perform ultrasound scanning towards a target 3, the operator can operate the ultrasound scanning probe 10 to emit N sets of ultrasound signals onto the target 3 from N different angles, and receives the N sets of ultrasound signals reflected and/or scattered by the target 3, as shown in step S10 in FIG. 6. Each of the N sets of ultrasound signals corresponds to one of the N different angles and N is a positive integer greater than 1. Each set of the ultrasound signals includes one or more beams of the ultrasound signals, and the number of beams of the ultrasound signals included in each set of the ultrasound signals depends on the specification of the ultrasound scanning probe 10. Taking FIG. 2 for example, the ultrasound scanning probe 10 emits 3 sets of ultrasound signals S1, S2 and S3 onto the target 3 from 3 different angles θ1, θ2 and θ3, and receives 3 sets of ultrasound signals S1, S2 and S3 reflected and/or scattered by the target 3; N is 3 in this embodiment. The angle θ1 may be 30 degree, the angle θ2 may be 0 degree and the angle θ3 may be −30 degree, but the angles are not so limited. Please note that the angles and the number of beams for emitting the ultrasound signals are determined based on actual application, and are not limited to the embodiment described above.

The ultrasound scanning probe 10 then transmits the ultrasound signals S1, S2 and S3 to the ultrasound scanning device 12. The conversion unit 120 of the ultrasound scanning device 12 converts the ultrasound signals S1, S2 and S3 into 3 ultrasound input images UI1, UI2 and UI3 of FIG. 3, as shown in step S12 in FIG. 6. In the embodiment, the ultrasound input image UI1 is converted from the ultrasound signal S1 which corresponds to the emitting angle 30 degree, the ultrasound input image UI2 is converted from the ultrasound signal S2 which corresponds to the emitting angle 0 degree, and the ultrasound input image UI3 is converted from the ultrasound signal S3 which corresponds to the emitting angle −30 degree.

The binarization unit 122 of the ultrasound scanning device 12 then binarizes the ultrasound input Images UI1, UI2 and UI3 to obtain 3 binarized images BI1, BI2 and BI3, as shown in FIG. 4 and in step 14 in FIG. 6.

The comparison unit 124 of the ultrasound scanning device 12 compares the binarized images BI1, BI2 and BI3 to determine whether a noise exists in at least one of the binarized images BI1, BI2 and BI3, as shown in step S16 in FIG. 6. The noise filtering unit 126 of the ultrasound scanning device 12 removes the noise from the i-th ultrasound input image corresponding to the i-th binarized image of the binarized images BI1, BI2 and BI3 when the noise exists, as shown in step S18 in FIG. 6, wherein i is a positive integer smaller than or equal to N. In the embodiment, the comparison unit 124 of the ultrasound scanning device 12 determines that noise N1 exists in the first binarised image BI1 and noise N3 exists in the third binarized image BI3, as shown in FIG. 4. The noise filtering unit 126 of the ultrasound scanning device 12 thus removes noise N1 from the first ultrasound input, image UI1 corresponding to the first binarized image BI1, and removes noise N3 from the third ultrasound input image UI3 corresponding to the third binarized image BI3.

After noises N1 and N3 are removed from the ultrasound input images UI1 and UI3, the image compounding unit 128 of the ultrasound scanning device 12 then compounds the ultrasound input images UI1, UI2 and UI3 into the ultrasound output image UI4, as shown in FIG. 5 and in step S20 in FIG. 6. The display of the ultrasound scanning device 12 finally displays the ultrasound output image UI4. Since in the present invention noises N1 and N3 are removed from the ultrasound input images UI1 and UI3 before the ultrasound input images UI1, UI2 and UI3 are compounded, the compounded ultrasound output image UI4 is not affected by noises N1 and N3 so that accuracy of the ultrasound output image UI4 can be effectively improved. Please note that aforementioned noises N1 and N3 may be side lobes, artifacts or other types of noises.

Figure 7:
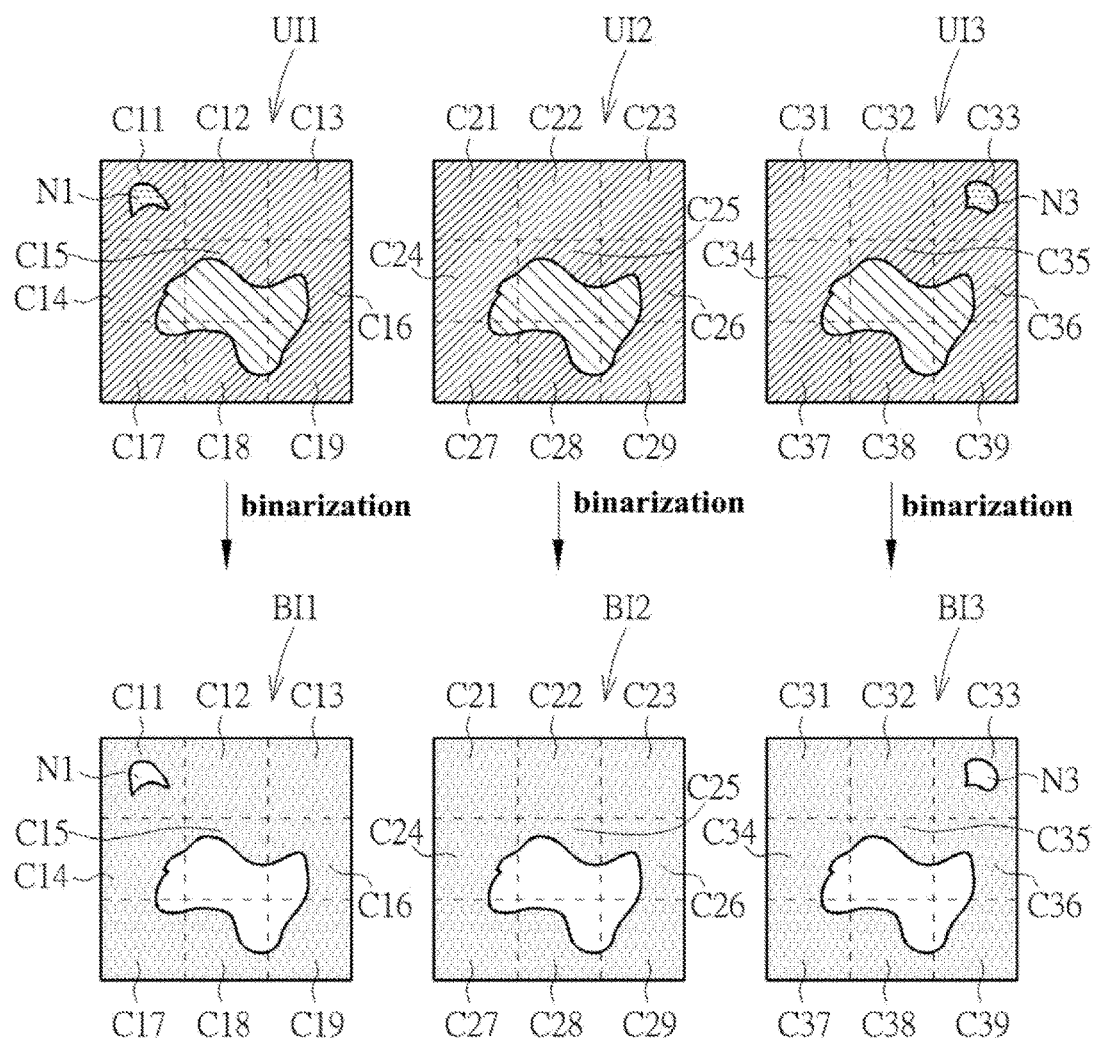
FIG. 7 is an illustrative diagram of dividing each of the ultrasound input images into 9 blocks.
Figure 8:
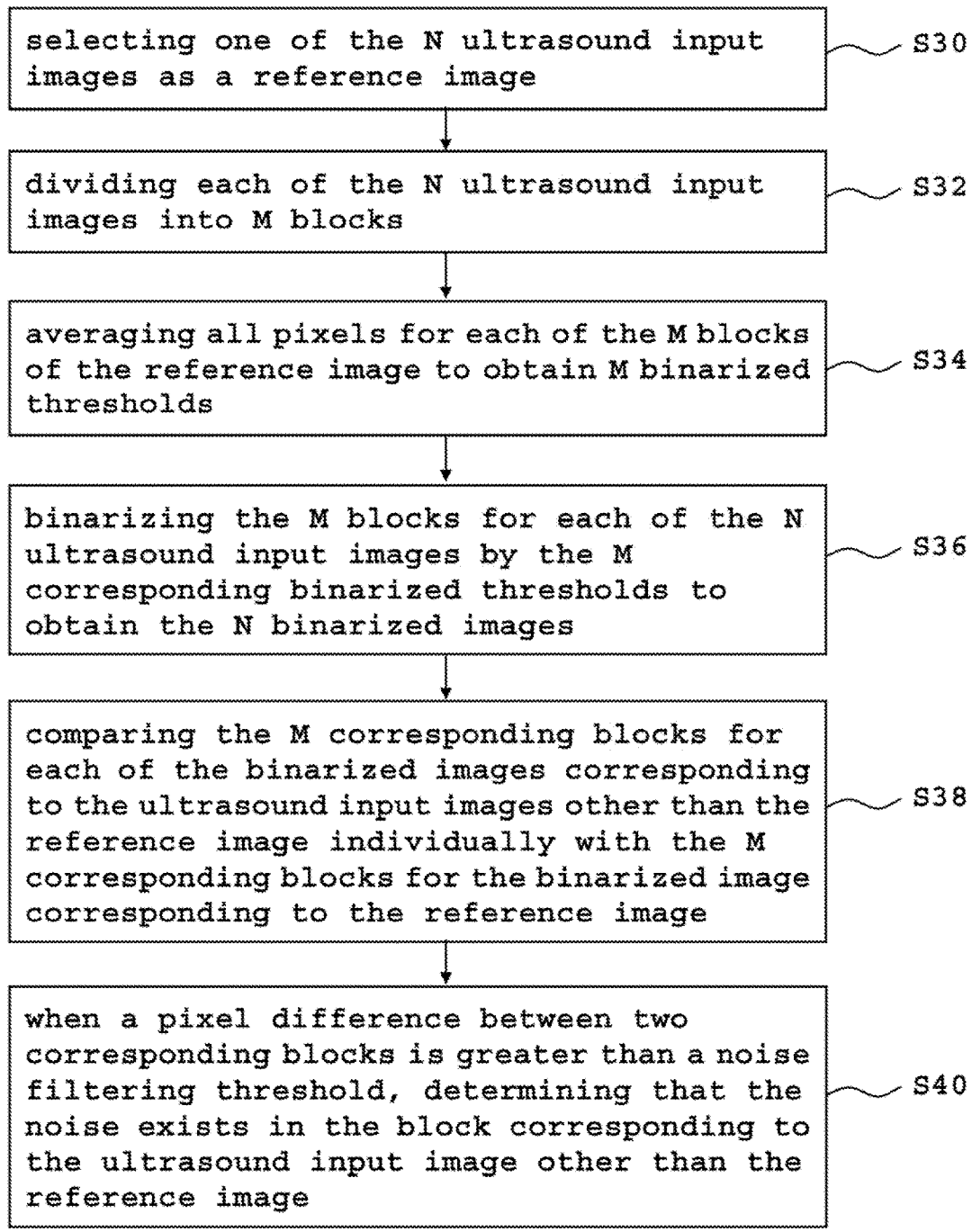
FIG. 8 is a detailed flowchart of steps S14 and S16 of FIG. 6 according to an embodiment of the present invention.

Please refer to FIG. 7 and FIG. 8. FIG. 7 is an illustrative diagram of dividing each of the ultrasound input images UI1, UI2 and UI3 of FIG. 3 into 9 blocks. FIG. 8 is a detailed flowchart of steps S14 and S16 of FIG. 6 according to an embodiment of the present invention. In the embodiment, step S14 in FIG. 6 includes steps S30 through S36 shown in FIG. 8, and step S16 in FIG. 6 includes steps S38 and S40 shown in FIG. 8.

After the conversion unit 120 of the ultrasound scanning device 12 converts the ultrasound signals S1, S2 and S3 into 3 ultrasound input images UI1, UI2 and UI3, as shown in FIG. 3 and in step S12 in FIG. 6, the binarization unit 122 of the ultrasound scanning device 12 selects one of the ultrasound input images UI1, UI2 and UI3 as a reference image as shown in step S30 in FIG. 8. In the embodiment, the reference image is the ultrasound input image converted from the ultrasound signal emitted from the smallest angle of the different angles θ1, θ2 and θ3. That is, the ultrasound signal corresponding to the reference image is emitted from the smallest angle of the different angles θ1, θ2 and θ3. Taking the embodiment shown in FIG. 2 for example, the smallest angle of the different angles θ1, θ2 and θ3 is θ2, which is 0 degree. Thus, the binarization unit 122 of the ultrasound scanning device 12 selects the ultrasound input image UI2 as the reference image.

The binarization unit 122 of the ultrasound scanning device 12 then divides each of the ultrasound input images UI1, UI2 and UI3 into M blocks as shown in step S32 in FIG. 8, wherein M is a positive integer. As shown in FIG. 7, the binarization unit 122 divides each of the ultrasound input images till, UI2 and UI3 into 9 blocks; M is 9 in the embodiment, but the present invention is not so limited. The binarization unit 122 may divide each of the ultrasound input images UI1/UI2 and UI3 into two or more blocks, or alternatively, not divide the ultrasound input images UI1, UI2 and UI3, depending on the actual application. As shown in FIG. 7, blocks C11-C19 of the ultrasound input image UI1, blocks C21-C29 of the ultrasound input image UI2, and blocks C31-C39 of the ultrasound input image UI3 correspond to one another accordingly.

The binarization unit 122 of the ultrasound scanning device 12 then averages all pixels for each of blocks C21-C29 of the reference image UI2 to obtain 9 binarized thresholds, as shown in step S34 in FIG. 8. That is, the binarization unit 122 averages all pixels of blocks C21 to obtain a binarized threshold, averages all pixels of blocks C22 to obtain another binarized threshold, and likewise to obtain a total of 9 binarized thresholds.

The binarization unit 122 then binarizes the corresponding blocks C11-C19, C21-C29 and C31-C39 of the ultrasound input images UI1, UI2 and UI3, respectively, by the binarized thresholds corresponding to the blocks C21-C29 so as to obtain 3 binarized images BI1, BI2 and BI3, as shown in step S36 In FIG. 8. That is, the binarization unit 122 binarizes block C11 of the ultrasound input image UI1, block C21 of the ultrasound input image bits and block C31 of the ultrasound input image UI3, respectively, by the binarized threshold corresponding to the block C21; binarizes block C12 of the ultrasound input image UI1, block C22 of the ultrasound input image UI2 and block C32 of the ultrasound input image UI3, respectively, by the binarized threshold corresponding to block C22; and likewise to obtain 3 binarized images BI1, BI2 and BI3.

The comparison unit 124 of the ultrasound scanning device 12 then compares blocks C11-C19 and C31-C39 of the binarized images BI1 and BI3 corresponding to the ultrasound input images UI1 and UI3 individually with the corresponding blocks C21-C29 of the binarized image BI2 corresponding to the reference image UI2, as shown, in step S38 in FIG. 8. When the pixel difference between two corresponding blocks is greater than a noise filtering threshold, the comparison unit 124 determines that the noise exists in the block corresponding to the ultrasound input image other than the reference image UI2, as shown in step S40 in FIG. 8.

Take the embodiment shown in FIG. 7 for example. Assuming that the noise filtering threshold is 10 and the pixel difference between block C11 of the binarised image BI1 and the corresponding block C21 of the binarized image BI2 is 30, the comparison unit 124 determines that noise N exists in block C11 corresponding to the ultrasound input image UI1. Similarly, assuming that the noise filtering threshold is 10 and the pixel difference between block C33 of the binarized image BI3 and the corresponding block C23 of the binarized image BI1 is 20, the comparison unit 124 determines that noise N3 exists in the block C33 corresponding to the ultrasound input image UI3. Additionally, in the embodiment since all the pixel differences between blocks C12-C19 of the binarized image BI1 and the corresponding blocks C22-C29 of the binarized image BI2 are 0 or smaller than the noise filtering threshold, the comparison unit 124 determines that no noise exists in blocks C12-C19 corresponding to the ultrasound input image UI1. Similarly, since all the pixel differences between blocks C31-C32 and C34-C39 of the binarized image BI3 and the corresponding blocks C21-C22 and C24-C29 of the binarized image BI2 are 0 of smaller than the noise filtering threshold, the comparison unit 124 determines that no noise exists in blocks C31-C32 and C34-C39 corresponding to the ultrasound input image UI3.

Finally, the image compounding unit 128 of the ultrasound scanning device 12 compounds the ultrasound input images UI1, UI2 and UI3 into an ultrasound output image UI4 after noises N1 and N3 are removed from the ultrasound input images UI1 and UI3, respectively, as shown in steps S18 and S20 in FIG. 6.

Figure 9:
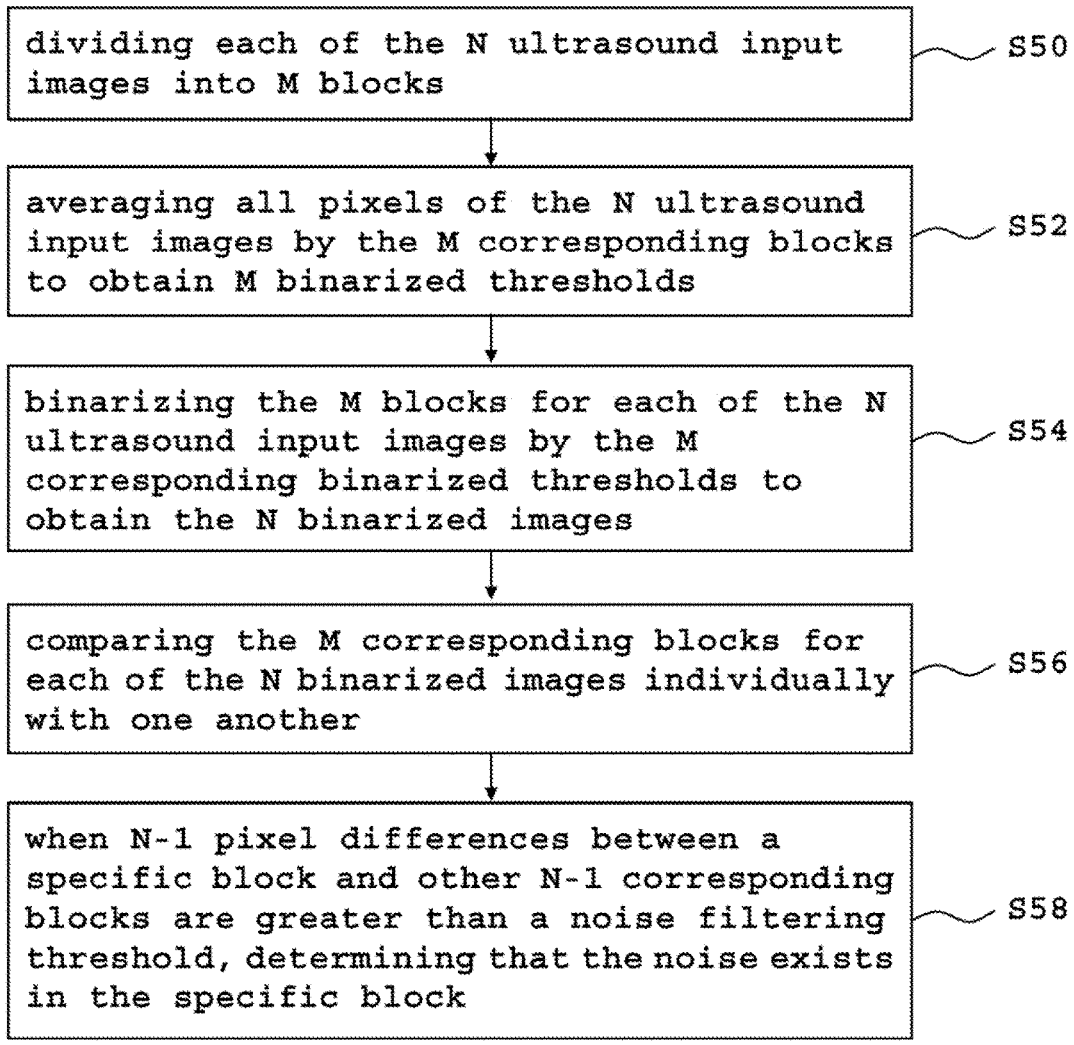
FIG. 9 is a detailed flowchart of steps S14 and S16 of FIG. 6 according to another embodiment of the present invention.

Please refer to FIG. 9. FIG. 9 is a detailed flowchart of steps S14 and S16 of FIG. 6 according to another embodiment of the present invention. In the embodiment, step S14 in FIG. 6 includes steps S50 through S54 in FIG. 9, and step S16 in FIG. 6 includes steps S56 and S58 in FIG. 9. The embodiment is described below by referring to FIG. 7 together with FIG. 9.

After the conversion unit 120 of the ultrasound scanning device 12 converts three ultrasound signals S1, S2 and S3 into three ultrasound input images UI1, UI2 and UI3, respectively, as shown in step S12 in FIG. 6, the binarization unit 122 of the ultrasound scanning device 12 then divides each of the ultrasound input images UI1, UI2 and UI3 into M corresponding blocks as shown in step S50 in FIG. 9, wherein M is a positive integer. As shown in FIG. 7, the binarization unit 122 divides each of the ultrasound input images UI1, UI2 and UI3 into 9 blocks; M is 9 in the embodiment, but the present invention is not so limited. The binarization unit 122 may divide each of the ultrasound input images UI1, UI2 and UI3 into two or more blocks, or alternatively, not divide the ultrasound input images UI1, UI2 and UI3 depending on the actual application. As shown in FIG. 7, blocks C11-C19 of the ultrasound input image UI1, blocks C21-C29 of the ultrasound input image UI2 and blocks C31-C39 of the ultrasound input image UI3 correspond to one another accordingly.

The binarization unit 122 then averages all pixels of the ultrasound input images UI1, UI2 and UI3 by the corresponding blocks C11-C19, C21-C29 and C31-C39 to obtain 9 binarized thresholds as shown in step S52 in FIG. 8. That is, the binarization unit 122 averages all pixels in block C11 of the ultrasound input image UI1, block C21 of the ultrasound input image UI2 and block C31 of the ultrasound input image UI3 to obtain a binarized threshold; averages all pixels in block C12 of the ultrasound input image UI1, block C22 of the ultrasound input image UI2 and block C32 of the ultrasound input image UI3 to obtain another binarized threshold; and likewise to obtain a total of 9 binarized thresholds.

The binarization unit 122 then binarizes the corresponding blocks C11-C19, C21-C29 and C31-C39 of the ultrasound input images UI1, UI2 and UI3, respectively, by the binarized thresholds corresponding to blocks C11-C19, C21-C29 and C31-C39 so as to obtain 3 binarized images BI1, BI2 and BI3, as shown in step S54 in FIG. 9. That is, the binarization unit 122 binarizes block C11 of the ultrasound input image UI1, block C21 of the ultrasound input image UI2 and block C31 of the ultrasound input image UI3, respectively, by the binarized threshold corresponding to blocks C11, C21 and C31; binarizes block C12 of the ultrasound input image UI1, block C22 of the ultrasound input image UI2 and block C32 of the ultrasound input image UI3, respectively, by the binarized threshold corresponding to blocks C12, C22 and C32; and likewise to obtain 3 binarized images BI1, BI2 and BI3.

The comparison unit 124 of the ultrasound scanning device 12 then compares the corresponding blocks C11-C19, C21-C29 and C31-C39 of the binarized images BI1, BI2 and BI3 individually with one another, as shown in step S56 in FIG. 9. When the pixel differences between a specific block among blocks C11-C19, C21-C29 and C31-C39 and two other corresponding blocks are greater than a noise filtering threshold, the comparison unit 124 determines that the noise exists in the specific block as shown in step S58 in FIG. 9.

Take the embodiment shown in FIG. 7 for example. Assuming that the noise filtering threshold is 10; the pixel difference between block C11 of the binarized image BI1 and the corresponding block C21 of the binarized image BI2 is 30; the pixel difference between block C11 of the binarized image BI1 and the corresponding block C31 of the binarized image BI3 is 30; and the pixel difference between block C21 of the binarized image BI2 and the corresponding block C31 of the binarized image BI3 is 0, which is smaller than the noise filtering threshold. Since the pixel differences between block C11 and the corresponding blocks C21, C31 are greater than the noise filtering threshold, the comparison unit 124 determines that noise N1 exists in block C11 corresponding to the ultrasound input image UI1. Similarly, assuming that the noise filtering threshold is 10; the pixel difference between block C13 of the binarized image BI1 and block C23 of the binarized image BI2 is 0 or smaller than the noise filtering threshold; the pixel difference between block C13 of the binarized image BI1 and block C33 of the binarized image BI3 is 20; and the pixel difference between block C23 of the binarized image BI2 and block C33 of the binarized image BI3 is 20. Since the pixel differences between block C33 and the corresponding blocks C13, C23 are greater than the noise filtering threshold, the comparison unit 124 determines that noise N3 exists in block C33 corresponding to the ultrasound input image UI3. As for other blocks in the embodiment, since all the pixel differences among blocks C12, C14-C19, C22, C24-C29, C32, and C34-C39 of the binarized images BI1, BI2 and BI3 are 0 or smaller than the noise filtering threshold, the comparison unit 124 determines that no noise exists in the blocks C12, C14-C19, C22, C24-C29, C32, and C34-C39.

Finally, the image compounding unit 128 of the ultrasound scanning device 12 compounds the ultrasound input images UI1, UI2 and UI3 into the ultrasound output image UI4 after noises N1 and N3 are removed from the ultrasound input images UI1 and UI3, respectively, as shown in steps S18 and S20 in FIG. 6.

Please note that the control logic of steps S10 through S20 in FIG. 6, steps S30 through S40 in FIG. 8, and steps S50 through S58 in FIG. 9 may be implemented by software. Of course, each portion and/or function in the control logic may be implemented by software, hardware or combination of software and hardware. Moreover, the conversion unit 120, the binarization unit 122, the comparison unit 124, the noise filtering unit 126 and the image compounding unit 128 may be implemented by circuits.

In sum, in the present invention, after a plurality of ultrasound input images corresponding to different angles are obtained, the ultrasound input images are converted into binarized images, and the binarized images are compared to determine whether any noise exists. When determining that a noise exists in the binarized images, the noise is removed from the ultrasound input image corresponding to the binarized image containing the noise. The ultrasound input images without noise are then compounded into a single ultrasound output image. Since the noise is removed from the ultrasound input images before the ultrasound input images are compounded, the compounded ultrasound output image is not affected by the noise so that accuracy of the ultrasound output image can be effectively improved. During the comparison process, according to requirements in the actual application, one of the ultrasound input images may be selected as the reference image for benchmarking; or alternatively, any two of the ultrasound input images maybe compared with each other so as to determine whether any noise exists.

Those skilled in the art will readily observe that numerous modifications and alterations of the system and method may be made while retaining the teachings of the present invention.

What is claimed is:

1. An ultrasound scanning method comprising steps of:
   emitting N sets of ultrasound signals onto a target from N different angels and receiving the N sets of ultrasound signals reflected and/or scattered by the target, wherein each of the N sets of ultrasound signals corresponds to one of the N different angles and N is a positive integer greater than 1;
   converting the N sets of ultrasound signals into N ultrasound input images;
   binarizing the N ultrasound input images to obtain N binarized images;
   comparing the N binarized images to determine whether a noise exists in at least one of the N binarized images;
   when the noise exists in an i-th binarized image of the N binarized images, removing the noise from an i-th ultrasound input image corresponding to the i-th binarized image, wherein i is a positive integer smaller than or equal to N; and
   compounding the N ultrasound input images into an ultrasound output image,
   wherein the step of binarizing the N ultrasound input images to obtain N binarized images further comprises:
      selecting one of the N ultrasound input images as a reference image;
      dividing each of the N ultrasound input images into M blocks wherein M is a positive integer;
      averaging all pixels for each of the M blocks of the reference image to obtain M binarized thresholds; and
      binarizinq the M blocks for each of the N ultrasound input images by the M corresponding binarized thresholds to obtain the N binarized images, and
   the step of comparing the N binarized images to determine whether a noise exists in at least one of the N binarized images further comprises:
      comparing the M corresponding blocks for each of the binarized images corresponding to the ultrasound input images other than the reference image individually with the M corresponding blocks for the binarized image corresponding to the reference image; and
      when a pixel difference between two corresponding blocks is greater than a noise filtering threshold, determining that the noise exists in the block corresponding to the ultrasound input image other than the reference image.

2. The ultrasound scanning method of claim 1, wherein the ultrasound signal corresponding to the reference image is emitted from a smallest angle of the N different angles.

3. The ultrasound scanning method of claim 2, wherein the smallest angel is 0 degree.

4. An ultrasound scanning method comprising steps of:
   emitting N sets of ultrasound signals onto a target from N different angles and receiving the N sets of ultrasound signals reflected and/or scattered by the target, wherein each of the N sets of ultrasound signals corresponds to one of the N different angles and N is a positive integer greater than 1;

converting the N sets of ultrasound signals into N ultrasound input images;
binarizing the N ultrasound input images to obtain N binarized images;
comparing the N binarized images to determine whether a noise exists in at least one of the N binarized images;
when the noise exists in an i-th binarized image of the N binarized images, removing the noise from an i-th ultrasound input image corresponding to the i-th binarized image, wherein i is a positive integer smaller than or equal to N; and
compounding the N ultrasound input images into an ultrasound output image,
wherein the step of binarizing the N ultrasound input images to obtain N binarized image further comprises:
dividing each of the N ultrasound input images into M blocks, wherein M is a positive integer;
averaging all pixels of the N ultrasound input images by the M corresponding blocks to obtain M binarized thresholds; and
binarizing the M blocks for each the N ultrasound input images by the M corresponding binarized thresholds to obtain the N binarized images, and
the step of comparing the N binarized images to determine whether a noise exists in at least one of the N binarized images further comprises:
comparing the M corresponding blocks each of the N binarized images individually with one another; and
when N-1 pixel differences between a specific block and other N-1 corresponding blocks are greater than a noise filtering threshold, determining that the noise exists in the specific block.

5. An ultrasound scanning system comprising:
an ultrasound scanning probe, configured to emit N sets of ultrasound signals onto a target from N different angles and receiving the N sets of ultrasound signals reflected and/or scattered by the target, wherein each of the N sets of ultrasound signals corresponds to one of the N different angles and N is a positive integer greater than 1; and
an ultrasound scanning device, communicating with the ultrasound scanning probe, the ultrasound scanning device comprising:
a conversion unit, configured to convert the N sets of ultrasound signals into N ultrasound input images;
a binarization unit, electrically connected to the conversion unit and configured to binarize the N ultrasound input image to obtain N binarized images;
a comparison unit, electrically connected to the binarization unit and configure to compare the N binarized images to determine whether a noise exists in at least one of the N binarized images;
a noise filter unit, electrically connected to the comparison unit, when the noise exists in an i-th binarized image of the N binarized image, the noise filter unit removes the noise from an i-th ultrasound input image corresponding to the i-th binarized image, wherein i is a positive integer smaller than or equal to N; and
an image compound unit, electrically connected to the conversion unit and the noise filter unit and configured to compound the N ultrasound input images into an ultrasound output image,
wherein the binarization unit selects one of the N ultrasound input images as a reference image, divides each of the N ultrasound input images into M blocks, averages all pixels for each of the M blocks of the reference image to obtain M binarized thresholds, and binarizes the M blocks for each of the N ultrasound input images by the M corresponding binarized thresholds to obtain the N binarized images, wherein M is a positive integer; and the comparison unit compares the M corresponding blocks for each of the binarized images corresponding to the ultrasound input images other than the reference image individually with the M corresponding blocks for the binarized image corresponding to the reference image, and determines that the noise exists in the block corresponding to the ultrasound input image other than the reference image when a pixel difference between two corresponding blocks is greater than a noise filtering threshold.

6. The ultrasound scanning system of claim 5, wherein the ultrasound signal corresponding to the reference image is emitted by the ultrasound scanning probe from a smallest angle of the N different angles.

7. The ultrasound scanning system of claim 6, wherein the smallest angle is 0 degree.

8. An ultrasound scanning system comprising:
an ultrasound scanning probe, configured to emit N sets of ultrasound signals onto a target from N different angels and receiving the N sets of ultrasound signals reflected and/or scattered by the target, wherein each of the N sets of ultrasound signals corresponds to one of the N different angles and N is a positive integer greater than 1; and
an ultrasound scanning device, communicating with the ultrasound scanning probe, the ultrasound scanning device comprising:
a conversion unit, configured to convert the N sets of ultrasound signals into N ultrasound input images;
a binarization unit, electrically connected to the conversion unit and configured to binarize the N ultrasound input images to obtain N binarized images;
a comparison unit, electrically connected to the binarization unit and configure to compare the N binarized images to determine whether a noise exists in at least one of the N binarized images;
a noise filter unit, electrically connected to the comparison unit, when the noise exists in an i-th binarized image of the N binarized images, the noise filter unit removes the noise from an i-th ultrasound input image corresponding to the i-th binarized image, wherein i is a positive integer smaller than or equal to N; and
an image compound unit, electrically connected to the conversion unit and the noise filter unit and configured to compound the N ultrasound input images into an ultrasound output image,
wherein the binarization unit divides each of the N ultrasound input images into M blocks, averages all pixels of the N ultrasound input images by the M corresponding blocks to obtain M binarized thresholds, and binarizes the M blocks for each of the N ultrasound input images by the M corresponding binarized thresholds to obtain the N binarized images, wherein M is a positive integer; and the comparison unit compares the M corresponding blocks for each of the N binarized images individually with one another, and determines that the noise exists in a specific block when N-1 pixel differences between the specific block and other N-1 corresponding blocks are greater than a noise filtering threshold.

\* \* \* \* \*